United States Patent [19]

Cadle

[11] 4,008,051
[45] Feb. 15, 1977

[54] COMPOSITE METAL ARTICLES
[75] Inventor: Terence M. Cadle, Coventry, England
[73] Assignee: Brico Engineering Limited, England
[22] Filed: Aug. 27, 1975
[21] Appl. No.: 608,098
[30] Foreign Application Priority Data
Sept. 11, 1974 United Kingdom ............ 39560/74
[52] U.S. Cl. .............................. 29/182.3; 29/182.1; 75/208 R; 75/200; 164/98
[51] Int. Cl.² ..................... B22D 19/00; B22F 7/08
[58] Field of Search .......... 29/182.1, 182.2, 182.3; 75/200, 208 R, 128 R, 128 WC; 164/98, 108, 109, 110

[56] References Cited
UNITED STATES PATENTS

| | | | |
|---|---|---|---|
| 2,753,858 | 7/1956 | Honeyman et al. | 29/182.1 |
| 2,753,859 | 7/1956 | Bartlett | 29/182.2 |
| 3,064,112 | 11/1962 | Hanzel | 164/98 |
| 3,567,528 | 3/1971 | Mohling | 75/128 |
| 3,709,107 | 1/1973 | Alger et al. | 29/182.1 |
| 3,790,352 | 2/1974 | Niimi et al. | 29/182.1 |
| 3,811,875 | 5/1974 | Goda et al. | 75/128 |
| 3,865,581 | 2/1975 | Sekino et al. | 75/128 |

FOREIGN PATENTS OR APPLICATIONS

| | | |
|---|---|---|
| 1,808,843 | 8/1969 | Germany |
| 1,161,663 | 1/1967 | United Kingdom |
| 892,770 | 3/1962 | United Kingdom |
| 1,164,289 | 9/1969 | United Kingdom |
| 639,138 | 6/1950 | United Kingdom |

Primary Examiner—Brooks H. Hunt
Attorney, Agent, or Firm—Leydig, Voit, Osann, Mayer & Holt, Ltd.

[57] ABSTRACT

A metal article is formed by a sintered body of an austenitic ferrous alloy containing chromium and nickel, the ferrous alloy having been infiltrated with a copper or copper base alloy during or after sintering of the body.

When a body of aluminum or aluminum alloy is cast around the metal article, a good bond therebetween is achieved. The metal article can thus provide a wear-resistant insert, for example a piston ring carrier in an aluminum piston or a valve seat in an aluminum cylinder head for an automobile.

24 Claims, 1 Drawing Figure

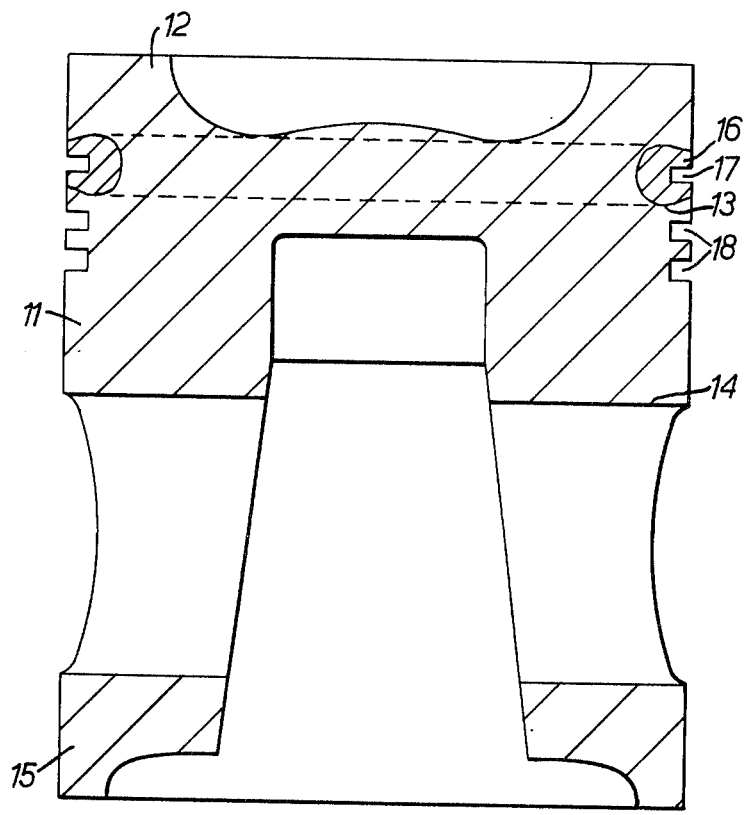

COMPOSITE METAL ARTICLES

BACKGROUND OF THE INVENTION

1. Field of the Invention

This invention relates to composite metal articles, and paticularly but not exclusively to ring carriers for pistons, blanks therefore, pistons incorporating such ring carriers, valve seats and cylinder heads incorporating valve seats.

2. Description of the Prior Art

It is well known to provide a piston with a ring carrier of a more wear resistant material than the body of the piston, a groove being machined in the ring carrier to receive the piston ring. For example aluminum alloy pistons for use in diesel engines may be provided with a ring carrier of a special cast iron, the ring carrier being placed in the mold, and the aluminum alloy being cast around it during manufacture of the piston. The ring groove is machined in the ring carrier during machining of the casting.

It is also well known that there are difficulties in obtaining a reliable bond between the ring carrier and the body of the piston, especially where the ring carrier is of a ferrous material and the body is of aluminum alloy. British Patent No. 892,770 (Hepworth & Grandage Limited) describes and claims a method of casting aluminum or an aluminum alloy on to a ferrous metal part which consists in spraying a coating of molybdenum on the surface of the ferrous metal part on to which the aluminum or aluminum alloy is to be cast, spraying a coating of aluminum or an aluminum alloy on to said molybdenum coating, preheating the coated part, and then casting aluminum or an aluminum alloy on to the sprayed surface.

British Patent No. 1,161,663 (Wellworthy Limited) describes and claims a process of producing a composite metal article, comprising applying a layer of tin to a sintered ferrous metal component, and casting a metal against the coated sintered component.

British Patent No. 1,164,289 (Wellworthy Limited) describes and claims a process of producing a composite metal article which comprises coating a ferrous metal component or a sintered ferrous or non-ferrous component with a spray deposit of molbdenum, coating the molybdenum with a layer of tin, and then casting a non-ferrous metal against the coated metal component.

In these cases, a surface layer of molybdenum, or of tin, or of molybdenum and tin, is essential, in order to effect a bond between the ferrous metal and the non-ferrous metal.

SUMMARY OF THE INVENTION

According to one aspect, the present invention provides a metal article comprising a body of aluminum or aluminum alloy, an insert in said body for increasing the load-bearing or wear-resistance capacity of the article, the insert comprising a sintered body of an austenitic ferrous alloy containing chromium and nickel, the ferrous alloy having been infiltrated with copper or copper-base alloy during or after sintering of the body.

According to another aspect, the present invention provides a metal article in the form of a piston for an internal combustion engine, the piston comprising a body of aluminum or aluminum alloy and a piston ring carrier around which the body has been cast, the carrier comprising a sintered body of an austenitic ferrous alloy containing chromium and nickel, the ferrous alloy having been infiltrated with copper or copper-base alloy during or after sintering of the body.

It will be apparent that in the present invention there is no requirement for a surface layer of a third metal to assist in bonding the ferrous metal and aluminum alloy, and in particular the copper infiltrant does not afford a surface layer; the amount of infiltrant visible at the surface depends on the density of the sinter, but is typically only 20% of the surface area.

It has been found that, if the ferrous body of the present invention is infiltrated with tin, and aluminum alloy is cast around it, inadequate bonding is obtained.

Moreover, using the same steps as in the present invention, but selecting a normal ferrous alloy (as distinct from an austenitic ferrous alloy), leads to results which lack utility; for example if a powder having the composition 4% copper, 0.8% carbon, balance (apart from impurities) iron, is selected, sintered to a density of 6.6 gm/cc, infiltrated with 15% copper, giving a density after infiltration of 7.4 gm/cc, and then cast into an aluminum alloy piston, satisfactory bonding does not take place between the aluminum alloy and the ferrous sinter.

To take another example, a powder having the composition range 1.7–2.1% chromium, 13.5–16.0% nickel, 0.8–1.0% manganese, 1.6–2.2% silicon, 6.0–8.0% copper, 2.5–2.7% total carbon, 0.65% maximum phosphorus, balance iron, was sintered to form a ferrous skeleton. It was found impossible satisfactorily to infiltrate it, even with amounts of copper or copper-base alloy as high as 30% by weight of the skeleton.

According to another aspect, the present invention provides a metal article, for example a ring carrier for incorporation in a piston body of aluminum alloy, comprising a sintered body of an austenitic ferrous alloy containing chromium and nickel, the ferrous alloy having been infiltrated with copper or copper-base alloy during or after sintering of the body.

According to yet another aspect, the present invention provides the method of manufacture of a metal article, suitable for incorporation as a load-bearing or wear-resistant inset in a body of aluminum or aluminum alloy, which comprises the steps of compacting and sintering a powder to form a sintered body of an austenitic ferrous alloy containing chromium and nickel, and infiltrating the ferrous alloy either simultaneously or in a subsequent step with copper or copper base alloy.

BRIEF DESCRIPTION OF THE DRAWINGS

A general example of the manufacture of a ring carrier and a ring carrier piston in accordance with the invention will now be given with reference to the accompanying drawing, which is a cross-section through a diesel piston.

DESCRIPTION OF THE PREFERRED EMBODIMENT

Referring to the drawing the piston comprises a piston body 11 of any known or convenient shape made from aluminum alloy, for example an alloy containing 12% silicon, remainder aluminum. The piston has a crown 12, a ring groove area 13, gudgeon pin boss 14 and a skirt 15. The ring groove area incorporates a ring carrier 16 made of ferrous alloy, in which the uppermost ring groove 17 is formed. Further ring grooves 18 are shown as being formed in the aluminum body of the piston, but if desired the ring carrier may be extended and two or more ring grooves may be machined in the ring carrier.

The ring carrier is manufactured by selecting austenitic stainless iron powder having a composition containing between 10 and 30% chromium, between 6 and 40% nickel, and optionally small amounts of manganese, silicon, molybdenum and/or other well known alloying elements. Preferably, manganese if present does not exceed 2%; silicon if present does not exceed 3%; molybdenum if present does not exceed 4%; carbon if present does not exceed 0.02%; phosphorus if present does not exceed 0.05%; and sulphur if present does not exceed 0.05%.

It will be understood that it is important that the powder is austenitic, and that although austenitic iron-based powders may contain up to 30% chromium and up to 40% nickel, not all ferrous materials containing 10–30% chromium and 6–40% nickel will be austenitic. The present invention is confined to sintered bodies of austenitic material.

Preferred ranges of chromium and nickel are 10–21% chromium, 6–14% nickel; further preferred ranges are 16–20% chromium, 8–14% nickel; 18–20% chromium, 8–12% nickel; and 16–18% chromium, 10–14% nickel. All percentages throughout the specification are given by weight.

The infiltrant may be substantially pure copper, or may be alloys predominantly of copper but containing for example small amounts of alloying elements such as manganese, iron, or cobalt. The copper or copper-base alloy may be from 12 to 22% by weight of the ferrous alloy.

A suitable lubricant, for example 0.75% zinc stearate, is added to the powder and thoroughly mixed with it in a suitable mixer. The zinc stearate disappears during the manufacturing process and is not present in the resulting product. In a particular example, powder having the composition 18% chromium, 8% nickel, 2.3% molybdenum, 1.5% manganese, 0.3% silicon, 0.01% combined carbon, balance (apart from impurities) iron was compacted in a suitable press and the green compact was then sintered in a suitable sintering furnace in a reducing protective atmosphere, preferably for at least 30 minutes, at a temperature of approximately 1100° C, thereby producing a sintered porous body or skeleton having an austenitic matrix.

The porous body had its pores filled with copper by placing copper in powder form or in the form of solid ring on the body, the copper amounting to 18% by weight of the porous body, and placing the body with the copper in a furnace at a temperature of 1100° C in a reducing protective atmosphere for a sufficient time such that the copper infiltrated the pores of the stainless steel body.

The body after infiltration was found to have a density of 7.6 gm/cc and a hardness of 185 $HV_5$ (Vickers Diamond hardness using a 5Kg. load).

The ring carrier, formed by the infiltrated body, was then dipped in molten aluminum alloy, placed in the mold for the piston, and the aluminum alloy cast around it. It was found that the bond between the ring carrier and the aluminum body of the piston was good; for example by metallographic examination of cross-sections of pistons in accordance with the invention, the ring carrier has been found to be bonded to the piston body over 100% of the joint line on that section, which is exceptional.

The piston containing the ring carrier was then machined and in particular the ring groove was machined in the ring carrier to receive a piston ring.

In a second particular example, powder having the composition 18% chromium, 10% nickel, 1.1% manganese, 0.5% silicon, 0.01% combined carbon, balance (apart from impurities) iron, was mixed and compacted as described above.

In this case, instead of the sintering and infiltration taking place in successive operations, the compact together with a ring of copper amounting to 15% by weight of the ferrous alloy were placed in a suitable furnace and heated, preferably for at least 30 minutes, in a reducing protective atmosphere at approximately 1100° C, the resultant product being a sintered ferrous body of which the pores were substantially filled with copper. This infiltrated body was then cast into an aluminum alloy piston as described above.

In a third particular example, powder was selected having the composition 12% chromium, 12% nickel, 2.1% molybdenum, 1.3% manganese, 0.07% silicon, 0.01% combined carbon, balance (apart from impurities) iron; in a fourth particular example, powder was selected having the composition 25% chromium, 20% nickel, 0.9% manganese, 0.2% silicon, 0.02% combined carbon, balance (apart from impurities) iron. Similar results were obtained, both when sintering and infiltrating in successive stages, and also when these operations were carried out simultaneously as described above.

The sintering temperature is not critical, but is preferably in the region of 1100°–1120° C, and for the infiltration it is clear that the temperature used must be above the melting point of copper or the copper-based alloy used. The time for infiltration depends on the size of the ferrous body to be infiltrated.

Although the invention has been described in relation to an aluminum piston which has been cast around a sintered ferrous piston ring carrier, the invention is also applicable in the production of a cylinder head of aluminum or aluminum alloy which has been cast around a sintered ferrous valve seat or, normally, a plurality of such valve seats.

I claim:
1. A metal article comprising
   a body of aluminum or aluminum alloy,
   an insert in said body for increasing the load-bearing or wear-resistance capacity of the article,
   the insert comprising a sintered body of an austenitic ferrous alloy containing chromium and nickel,
   the ferrous alloy having been infiltrated with copper or copper-base alloy during or after sintering of the body, and
   the body having been cast around the insert, the insert having been thereby bonded to the body over substantially the whole of its surface which is in contact with the body.

2. A metal article according to claim 1 in the form of a cylinder head for an internal combustion engine, in which the insert is a valve seat.

3. A metal article according to claim 1 wherein the ferrous alloy contains 10–30% chromium, 6–40% nickel, 0–2% manganese, 0–3% silicon, 0–4% molybdenum and 0–0.2% carbon.

4. A metal article according to claim 1 wherein the ferrous alloy contains 10–21% chromium and 6–14% nickel.

5. A metal article according to claim 1 wherein the ferrous alloy contains 16–20% chromium and 8–14% nickel.

6. A metal article according to claim 1 wherein the ferrous alloy contains 18–20% chromium and 8–12% nickel.

7. A metal article according to claim 1 wherein the ferrous alloy contains 16–18% chromium and 10–14% nickel.

8. A metal article according to claim 1 wherein the copper or copper base alloy is from 12 to 22% by weight of the ferrous alloy.

9. A metal article according to claim 1 wherein the sintered body was formed from a powder having the composition 18% chromium, 8% nickel, 2.3% molybdenum, 1.5% manganese, 0.3% silicon, 0.01% combined carbon, the balance (apart from impurities) being iron.

10. A metal article according to claim 1 wherein the sintered body was formed from a powder having the composition 18% chromium, 10% nickel, 1.1% manganese, 0.5% silicon, 0.01% combined carbon, the balance (apart from impurities) being iron.

11. A metal article according to claim 1 wherein the sintered body was formed from a powder having the composition 12% chromium, 12% nickel, 2.1% molybdenum, 1.3% manganese, 0.07% silicon, 0.01% combined carbon, the balance (apart from impurities) being iron.

12. A metal article according to claim 1 wherein the sintered body was formed from a powder having the composition 25% chromium, 20% nickel, 0.9% manganese, 0.2% silicon, 0.02% combined carbon, the balance (apart from impurities) being iron.

13. A metal article in the form of a piston for an internal combustion engine,
the piston comprising a body of aluminum or aluminum alloy and a piston ring carrier around which the body has been cast,
the carrier comprising a sintered body of an austenitic ferrous alloy containing chromium and nickel,
the ferrous alloy having been infiltrated with copper or copper-base alloy during or after sintering of the body.

14. A method of manufacture of an aluminum or aluminum alloy article incorporating a ferrous alloy insert comprising the steps of
compacting and sintering a powder to form a sintered body of an austenitic ferrous alloy containing chromium and nickel,
infiltrating the ferrous alloy either simultaneously or in a subsequent step with copper or copper base alloy, and
casting the aluminum or aluminum alloy around the insert.

15. A method of manufacture according to claim 14 wherein the ferrous alloy contains 10–30% chromium, 6–40% nickel, 0–2% manganese, 0–3% silicon, 0–4% molybdenum and 0–0.2% carbon.

16. A method of manufacture according to claim 14 wherein the ferrous alloy contains 10–21% chromium and 6–14% nickel.

17. A method of manufacture according to claim 14 wherein the ferrous alloy contains 16–20% chromium and 8–14% nickel.

18. A method of manufacture according to claim 14 wherein the ferrous alloy contains 18–20% chromium and 8–12% nickel.

19. A method of manufacture according to claim 14 wherein the ferrous alloy contains 16–18% chromium and 10–14% nickel.

20. A method of manufacture according to claim 14 wherein the copper or copper base alloy is from 12 to 22% by weight of the ferrous alloy.

21. A method of manufacture according to claim 14 wherein the sintered body was formed from a powder having the composition 18% chromium, 8% nickel, 2.3% molybdenum, 1.5% manganese, 0.3% silicon, 0.01% combined carbon, the balance (apart from impurities) being iron.

22. A method of manufacture according to claim 14 wherein the sintered body was formed from a powder having the composition 18% chromium, 10% nickel, 1.1% manganese, 0.5% silicon, 0.01% combined carbon, the balance (apart from impurities) being iron.

23. A method of manufacture according to claim 14 wherein the sintered body was formed from a powder having the composition 12% chromium, 12% nickel, 2.1% molybdenum, 1.3% manganese, 0.07% silicon, 0.01% combined carbon, the balance (apart from impurities) being iron.

24. A method of manufacture according to claim 14 wherein the sintered body was formed from a powder having the composition 25% chromium, 20% nickel, 0.9% manganese, 0.2% silicon, 0.02% combined carbon, the balance (apart from impurities) being iron.

* * * * *